A. G. MATHER.
VARIABLE SPEED MECHANISM.
APPLICATION FILED JAN. 20, 1909.

928,679.

Patented July 20, 1909.

Witnesses:
W. T. Cliff Quin

Inventor:
Allan G. Mather

UNITED STATES PATENT OFFICE.

ALLAN G. MATHER, OF OTTAWA, ONTARIO, CANADA.

VARIABLE-SPEED MECHANISM.

No. 928,679.

Specification of Letters Patent.

Patented July 20, 1909.

Application filed January 20, 1909. Serial No. 473,247.

*To all whom it may concern:*

Be it known that I, ALLAN G. MATHER, a citizen of the United States, residing at Ottawa, in the county of Carleton, Province of Ontario, in the Dominion of Canada, have invented certain new and useful Improvements in Variable-Speed Mechanisms, of which the following is a specification, reference being had to the accompanying drawings.

The invention relates to speed changing mechanism for rotating members.

The object of the invention is to provide a new simple and durable device whereby the speed of a rotating member can be set at any desired rate until it reaches a maximum limit determined by the speed of rotation of the driving surface. Compressed air or any other suitable controlling medium can be employed. The invention consists of a friction pulley loosely mounted on a shaft, friction shoes carrying pistons adapted to form a frictional contact between said friction shoes and said pulley, a plurality of cylinders, securely mounted on said shaft, and ducts for conveying pressure to said pistons, which pressure may be adjusted by any suitable differential valve to regulate the speed determined.

Figure 1:
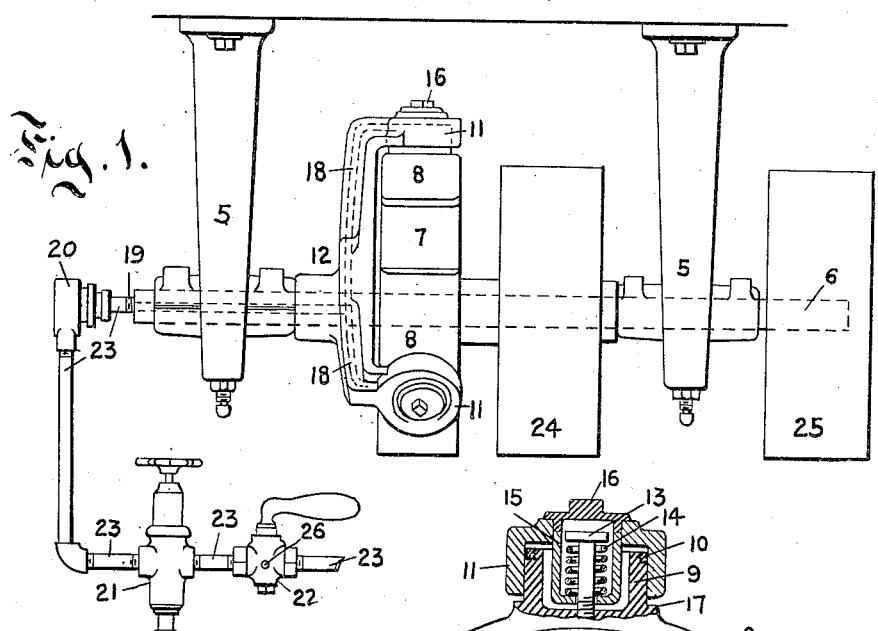
Figure 2:
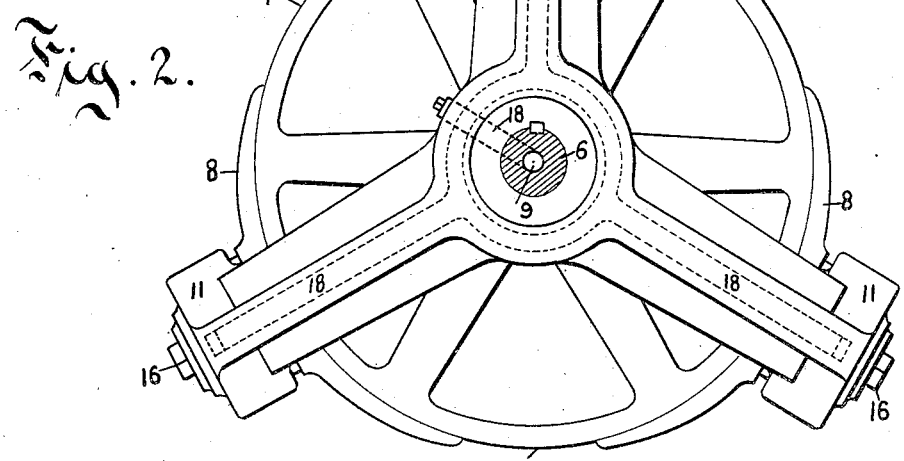

In the drawings Figure 1 is a side elevation of the machine—Fig. 2 is a end elevation in part section.

Referring to the drawings in which like numerals for reference indicate corresponding parts in each figure, 5—5 indicate bearing boxes of any suitable material, 6 represents the shaft upon which the pulley 7 is loosely mounted having the outer face of its rim forming the friction surface adapted to the action of the friction shoes hereinafter described.

8 are friction shoes bearing on the face of the pulley 7, and provided with pistons 9, having cup leathers 10 or other suitable packing, to prevent leakage, carried in cylinders 11 which are formed in the ends of spider 12, keyed or otherwise fastened to the shaft 6, 13 is a bolt screwed into the shoes 8 in the center of the piston 9, 14 is a bolt retracting spring held in position by the bolt 13 and the surrounding thimble 15, screwed into the cylinder 11, the cap 16 covers the opening and prevents leakage from the cylinder.

17 is a shoulder on the piston for limiting the travel of the friction shoes 8. from the face of the pulley 7.

The shaft 6 is drilled centrally at 19 to a point where it reaches the duct 18, which in turn communicates with the rear end of the cylinder 11. The hole 19 is tapped in the shaft 6 to receive the tube 23, and is further connected through a suitable stuffing box 20, with the pressure regulator 21, and stop cock 22, compressed air or other suitable means is supplied to the mechanism from any convenient source through the tube 23.

It will thus be readily seen that when pressure is admitted through the cock 22 and regulator 21, it will act on the pistons 9 in the cylinder 11 and press the friction shoes 8 against the surface 7, with a force corresponding to the pressure at which the regulator 21 is set and thus determine the speed of rotation of the pulley 25 fastened to the shaft 6. If the resistance overcome, by the pulley 25 is increased and the shoes 8 tend to slip, the centrifugal force of the shoes will decrease and in combination with the pressure in the cylinders bring the shaft back to the normal rate of revolutions for which it is set. The cock 22 is provided with an opening 26, so that when it is closed all pressure is removed from the cylinders and the shoes 8 are drawn out of contact with the face 7 and all rubbing contact thus avoided. 24 is the driving pulley fixedly mounted on the hub of the friction surface. It will also be apparent from the foregoing description that the speed of the machine may be varied without stopping the machine and may be kept at such varied speed by the regulation of the air pressure by means of the regulator 21.

While my invention is adapted to the operation of any machine or mechanism driven by a continuously running line shaft whose speed it is desirous to maintain or vary while running, it is also adapted to the operation of mechanisms driven by gas engines in which the speed often exceeds a desired limit. It can however be used in any mechanism in which it is desired to effectively regulate the speed of the driving shaft.

What I claim for invention and desire Letters Patent for is.

In a variable speed mechanism, a shaft, a pulley loosely mounted thereon, a spider fixedly mounted on said shaft, a plurality of shoes at the end of said spider, said shoes provided with pistons carried in cylinders, ducts for conveying pressure to said cylinders through the arms of the spider, and communicating through a suitable passage drilled in the shaft with a tube having a regulator and a stop cock, means circulating through said passages and ducts, controlled by said regulator, to effect an engagement between the shoes and the pulley.

ALLAN G. MATHER.

Witnesses:
  W. T. CUFFE-QUIN,
  HUGH J. DUNN.